United States Patent
Yasukawa et al.

(10) Patent No.: US 8,664,580 B2
(45) Date of Patent: Mar. 4, 2014

(54) OPTICAL SENSOR AND ELECTRONIC EQUIPMENT

(75) Inventors: Kohei Yasukawa, Osaka (JP); Norikazu Okada, Osaka (JP); Yasuyuki Shirasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 219 days.

(21) Appl. No.: 13/402,225

(22) Filed: Feb. 22, 2012

(65) Prior Publication Data
US 2012/0211639 A1 Aug. 23, 2012

(30) Foreign Application Priority Data

Feb. 23, 2011 (JP) ................................ 2011-036615
Nov. 11, 2011 (JP) ................................ 2011-247689

(51) Int. Cl.
*H01J 40/14* (2006.01)

(52) U.S. Cl.
USPC ..................................................... 250/214 R

(58) Field of Classification Search
USPC .......... 250/206, 214 R, 214.1, 214 C, 214 A; 257/290–292; 327/514; 330/252, 277, 330/288
See application file for complete search history.

(56) References Cited

U.S. PATENT DOCUMENTS

| | | | |
|---|---|---|---|
| 4,518,933 A | 5/1985 | Kroner | |
| 5,969,399 A | 10/1999 | Perner | |
| 6,333,804 B1 * | 12/2001 | Nishiyama et al. | 398/202 |
| 7,253,391 B2 | 8/2007 | Koyama et al. | |
| 7,406,018 B2 * | 7/2008 | Ibusuki et al. | 369/100 |
| 2001/0020909 A1 * | 9/2001 | Sakuragi et al. | 341/139 |
| 2005/0045807 A1 * | 3/2005 | Sakaguchi | 250/214 R |
| 2005/0185525 A1 * | 8/2005 | Ibusuki et al. | 369/30.08 |
| 2006/0227231 A1 | 10/2006 | Okada | |

FOREIGN PATENT DOCUMENTS

| | | | |
|---|---|---|---|
| JP | 57-142523 A | | 9/1982 |
| JP | 57-152203 A | | 9/1982 |
| JP | 6-22999 Y2 | | 6/1994 |
| JP | 9-276 U | | 5/1997 |
| JP | 11-345995 A | | 12/1999 |
| JP | 2000-182263 A | | 6/2000 |
| JP | 2000-332546 A | | 11/2000 |
| JP | 2005-100568 A | | 4/2005 |

(Continued)

OTHER PUBLICATIONS

English translation of Office Action for Japanese Application No. 2011-247689, dated Feb. 19, 2013.

*Primary Examiner* — Seung C Sohn
(74) *Attorney, Agent, or Firm* — Birch, Stewart, Kolasch & Birch, LLP

(57) ABSTRACT

The optical sensor includes a photodiode PD1 with its anode grounded, a diode group DG1 having one end connected to a cathode of the photodiode PD1, a current source I1 having one end connected to the other end of the diode group DG1, a power supply section for applying a constant voltage to the other end of the current source I1, and a grounded-emitter NPN transistor $Q_{OUT1}$ having a base connected to the cathode of the photodiode PD1 and a collector connected to one end of the current source I1. The diode group DG1 is provided by n diodes $D_1, D_2, \ldots, D_n$ connected in series so that their forward directions are directed toward the photodiode PD1 side, and a photocurrent which flows from a connecting point between the diode group and the current source to the photodiode is converted into a voltage and outputted as a photoelectric conversion signal.

12 Claims, 16 Drawing Sheets

(56) References Cited

FOREIGN PATENT DOCUMENTS

| JP | 2006-294682 A | 10/2006 |
| JP | 2011-23753 A | 2/2011 |
| WO | WO 2010/065167 A1 | 6/2010 |

* cited by examiner

OPTICAL SENSOR AND ELECTRONIC EQUIPMENT

TECHNICAL FIELD

The present invention relates to an optical sensor and electronic equipment.

BACKGROUND ART

A conventional optical sensor is designed to ensure a gain by applying logarithmic compression to two photodiode currents by diodes and then performing differential comparison outputs (see, e.g., JP 2006-294682 A (PTL1) and JP S57-142523 A (PTL2)).

Among other conventional optical sensors are those in which photocurrents of two photodiodes are amplified by Darlington transistor to obtain high gain (see, e.g., JP H11-345995 A (PTL3)).

Photointerrupters to be used for object detection are provided in multiplicity as much as several tens, for example, in copiers in which paper moves through various sites within the copier. For this reason, lower-cost, higher-performance optical sensors are desired.

Under these circumstances, there may be conceived methods in which two photodiodes are used and diode compression and differential comparison are followed to obtain gains as shown in PTL1 and PTL2. However, diodes have a temperature characteristic of −2 mV/° C. so as to be incapable of providing a sufficient voltage as acquisition output signal at as high temperatures as 100° C. or so, problematically. As a result, depending on succeeding-stage circuit construction, there can occur malfunctions or operational fluctuations.

SUMMARY OF INVENTION

Technical Problem

An object of the invention is, therefore, to provide an optical sensor, as well as electronic equipment using the same, capable of ensuring sufficient gain without incurring voltage drops of output signals.

Solution to Problem

In order to achieve the above object, there is provided an optical sensor comprising:

a photodiode with its anode grounded;

a current-voltage conversion section having one end connected to a cathode of the photodiode;

a current source having one end connected to the other end of the current-voltage conversion section;

a power supply section for applying a constant voltage to the other end of the current source; and a grounded-emitter or grounded-source output transistor having a base or gate connected to the cathode of the photodiode and a collector or drain connected to one end of the current source, wherein the current-voltage conversion section includes a semiconductor device group having n PN junctions (where n is an integer of 2 or more) connected in series so that their forward directions are directed toward the photodiode side, and a photocurrent which flows from a connecting point between the current-voltage conversion section and the current source to the photodiode is converted into a voltage and outputted as a photoelectric conversion signal.

With this constitution, when the PN junction of the semiconductor device group is accumulated to 2 stages or more in series in the current-voltage conversion section, the voltage level of the photoelectric conversion signal derived from the connecting point between the current-voltage conversion section and the current source increases to an integral multiple depending on the number of PN junction stages. Accordingly, sufficient gain can be ensured without incurring voltage drops of outputted photoelectric conversion signals. Also, forming the photodiode, the current-voltage conversion section, the current source, the power supply section, and the output transistor on a semiconductor substrate makes it possible to reduce the chip area and therefore realize an optical sensor of smaller size and lower cost, as compared with cases in which a large resistor is used in the current-voltage conversion section.

In addition, using a resistor as the current-voltage conversion section instead of the semiconductor device group necessitates use of a large resistor, leading to area increases, disadvantageously.

In one embodiment of the invention, the power supply section is a constant voltage circuit which has power-supply-section use n+2 diodes (where n is an integer of 2 or more) connected in series so that their forward directions are of one same direction, and which outputs the constant voltage based on a forward voltage of the power-supply-section use series-connected n+2 diodes.

According to this embodiment, power-supply-section use diodes are accumulated to a plurality (n+2) of stages in the constant voltage circuit, so that the forward voltage of the series-connected n+2 power-supply-section use diodes become lower at high temperatures and higher at low temperatures. Thus, n+2 power-supply-section use diodes series connected so that their forward directions are of the same direction are used in the constant voltage circuit, by which the constant voltage is changed subservient to temperature changes. In this case, while the PN junctions of the semiconductor device group in the current-voltage conversion section are provided in n stages, the power-supply-section use diodes in the constant voltage circuit are set to n+1 stages or more. By doing so, a reverse bias is given to the photodiode formed generally on a Si substrate, so that a construction in which the n-stage PN junctions are accumulated on the Si substrate to perform current-voltage conversion can be realized within the Si substrate on which the constant voltage circuit is formed.

In one embodiment of the invention, the current-voltage conversion section is provided by n (where n is an integer of 2 or more) diodes connected in series so that their forward directions are directed toward the photodiode side.

It is noted that the diodes of the current-voltage conversion section may be provided by diode-connected transistors.

According to this embodiment, the current-voltage conversion section can be realized with a simple construction.

In one embodiment of the invention, the current-voltage conversion section is a Darlington transistor in which a plurality of transistors are Darlington-connected, and the constant voltage from the power supply section is applied to a collector of the Darlington transistor, a cathode of the photodiode is connected to an emitter of the Darlington transistor, and a collector or drain of the output transistor is connected to a base of the Darlington transistor.

According to this embodiment, in a case where accumulating the PN junctions of the semiconductor device group to a plurality of stages causes the voltage of the photoelectric conversion signal to increase higher so as to eliminate the likelihood, use of the Darlington transistor in which the first-stage transistor and the output-stage transistor are Darlington-connected so that the photoelectric conversion signal is outputted from the base of the Darlington transistor makes it possible to lower the voltage of the photoelectric conversion signal by several tens of mV to several hundreds of mV, thus voltage can be adjusted, as compared with cases where the PN junctions of the semiconductor device group are simply accumulated to a plurality of stages.

The Darlington connection to be used in conventional optical sensors is for performing current amplification with the base of the transistor serving as an input, as in the case of PTL3 (JP H11-345995 A) in which the photodiode and the circuit are Darlington-connected. In this invention, with input and output reversed, the base of the Darlington transistor is used as a voltage output (photoelectric conversion signal).

Also, the current amplification such as in PTL3 depends on the current amplification factor hfe of the transistor, involving quite large characteristic variations.

Meanwhile, in this invention in which the base of the Darlington transistor is used as a voltage output, for example, in the case of a Darlington transistor of two-stage construction, given a thermal voltage $V_T$ of the transistor, a base-emitter voltage $V_{BE}$, and a current amplification factor hfe, a voltage of a photoelectric conversion signal can be expressed by:

$$2V_{BE} - V_T \times \ln(hfe).$$

For instance, if hfe=30, then the voltage of the photoelectric conversion signal is $$VT \times \ln(hfe) = 26 \times 3.4 = 88 \text{ mV}.$$

If a variation of hfe=25 is involved, the voltage is compressed to $$VT \times \ln(hfe) = 26 \times 3.2 = 84 \text{ mV},$$

hence a sufficient likelihood with respect to $2 V_{BE}$=about 1V.

Also, in a case where the input light to the photodiode involves AC (alternating current) fluctuations, if a photocurrent Iin flows through the photodiode, then $dV_{BE}/dIin$ is expressed by $$dV_{BE}/dIin = 2V_T/Iin,$$

so that AC signals can be processed absolutely independent of the current amplification factor hfe of the transistor.

In one embodiment of the invention, the current-voltage conversion section is a Darlington transistor in which a plurality of transistors are Darlington-connected, and one end of the current source is connected to a collector of the Darlington transistor, a cathode of the photodiode is connected to an emitter of the Darlington transistor, and a collector or drain of the output transistor is connected to a base of the Darlington transistor.

According to this embodiment, since the collector potential of the Darlington transistor is not directly linked with the voltage rise of the power supply section, instantaneous rise of the base potential of the output transistor decreases and the drop of the base potential of each of the transistors constituting the Darlington transistor is suppressed, so that the start-up time until normal operation is fulfilled at a rise of the power supply voltage can be shortened.

In one embodiment of the invention, the current-voltage conversion section is a Darlington transistor in which a plurality of transistors are Darlington-connected, the optical sensor further includes a current source circuit for feeding a current to the Darlington transistor, and an output end of the current source circuit is connected to a collector of the Darlington transistor, a cathode of the photodiode is connected to an emitter of the Darlington transistor, and a collector or drain of the output transistor is connected to a base of the Darlington transistor.

According to this embodiment, since the collector potential of the Darlington transistor is not directly linked with the voltage rise of the power supply section, instantaneous rise of the base potential of the output transistor decreases and the drop of the base potential of each of the transistors constituting the Darlington transistor is suppressed, so that the start-up time until normal operation is fulfilled at a rise of the power supply voltage can be shortened.

In one embodiment of the invention, the optical sensor further comprises a grounded-emitter or grounded-source current-mirror use transistor having a collector or drain connected to a cathode of the photodiode and a base or gate connected in common to the output transistor, wherein the Darlington transistor, the output transistor, and the current-mirror use transistor constitute a Wilson-type current mirror circuit.

According to this embodiment, a constant current formed by the Wilson-type current mirror circuit flows into the Darlington transistor, by which the gain adjustment is enabled. An input current to the base of the Darlington transistor can be suppressed by the Wilson-type current mirror circuit, making it possible to stabilize the input current and therefore suppress variations in gain.

In one embodiment of the invention, the optical sensor further comprises a comparator to one input terminal of which the photoelectric conversion signal is inputted.

According to this embodiment, a voltage output (photoelectric conversion signal) subjected to current-voltage conversion by the plurality of stages of PN junctions of the semiconductor device group in the current-voltage conversion section is inputted to the comparator, thus making it possible to fulfill voltage amplification or A/D conversion (the comparator makes it possible to obtain a higher output voltage with respect to the differential input level or to digitize the differential input level). When such a comparator is formed of bipolar devices, temperature characteristics can be coincident with the diode so that a stable operation can be fulfilled without changing the bipolar devices into a diode construction of a plurality of stages. Further, with a comparator using MOS devices, since the gate-source voltage $V_{GS}$ of the MOS transistor is not coincident with the base-emitter voltage $V_{BE}$ of the transistor, it is advantageous to use a voltage resulting from voltage conversion by a plurality of diodes.

In one embodiment of the invention, the optical sensor further comprises: two photoelectric conversion circuits each having the photodiode, the current-voltage conversion section, and the output transistor; a semiconductor substrate on which the two photoelectric conversion circuits are formed; the semiconductor device group in the current-voltage conversion section has the series-connected two PN junctions; and a comparator to one input terminal of which the photoelectric conversion signal derived from one of the two photoelectric conversion circuits is inputted, and to the other input terminal of which the photoelectric conversion signal derived from the other one of the two photoelectric conversion circuits is inputted, wherein the two PN junctions of the semiconductor device group in each of the current-voltage conversion sections of the two photoelectric conversion circuits are set in an alternately-crossing arrangement on the semiconductor substrate.

In this case, the semiconductor device group may also be two diodes connected in series or two series-connected transistors of diode connection, or a Darlington transistor of a two-stage structure.

According to this embodiment, in order to reduce variations in the forward voltage of the two PN junctions of the semiconductor device group in the current-voltage conversion section, it is advantageous that the two PN junctions of the semiconductor device group in each current-voltage conversion section of the two photoelectric conversion circuits are placed on the semiconductor substrate in an alternately-crossing arrangement. As a result of this, variations in injection of impurities for making the devices by diffusion or the like as well as variations in patterning on the wafer can be minimized.

In one embodiment of the invention, the optical sensor further comprises two photoelectric conversion circuits each having the photodiode, the current-voltage conversion section, and the output transistor, the current-voltage conversion section being a Darlington transistor in which a first-stage transistor and an output-stage transistor are Darlington-connected, wherein the constant voltage from the power supply section is applied to a collector of the Darlington transistor, a cathode of the photodiode is connected to an emitter of the Darlington transistor, and a collector or drain of the output transistor is connected to a base of the Darlington transistor, the optical sensor further comprises a comparator to one input terminal of which the photoelectric conversion signal derived from one of the two photoelectric conversion circuits is inputted, and to the other input terminal of which the photoelectric conversion signal derived from the other one of the two photoelectric conversion circuits is inputted, one of the two photoelectric conversion circuits includes a grounded-emitter or grounded-source first current-mirror use transistor having a collector or drain connected to a cathode of the photodiode, the other one of the two photoelectric conversion circuits includes a grounded-emitter or grounded-source second current-mirror use transistor having a collector or drain connected to a cathode of the photodiode and a base or gate connected to the collector or drain, and wherein the base or gate of the second current-mirror use transistor is connected to the base or gate of the first current-mirror use transistor, and the Darlington transistor, the output transistor, and the second current-mirror use transistor constitute a Wilson-type current mirror circuit.

According to this embodiment, for input of photoelectric conversion signals from the two photoelectric conversion circuits into the comparator, it is desirable that constant currents flowing through the current-voltage conversion sections are symmetrical. For this purpose, base or gate potentials of the first, second current-mirror use transistors of the two photoelectric conversion circuits are made to be common ones, by which variations in the constant current flowing through the current-voltage conversion sections can be reduced.

In one embodiment of the invention, the optical sensor further comprises a shielding part for shielding from input light for the photodiode of the other one of the two photoelectric conversion circuits.

According to this embodiment, only one photodiode out of the two photoelectric conversion circuits is used, while the current source of the other photoelectric conversion circuit for which input light to the photodiode is shielded is used also in the one photoelectric conversion circuit. Therefore, small current fluctuations of the current source due to fluctuations of the photocurrent to the photodiode can be suppressed.

In one embodiment of the invention, there is provided an electronic equipment using the above optical sensor.

According to this embodiment, by using the optical sensor that allows a sufficient gain to be ensured without incurring voltage drops of output signals, it becomes possible to realize electronic equipment less in variations and high in reliability.

Whereas light-receiving ICs (Integrated Circuits) to be used in such an optical sensor generally require an area of 1 $mm^2$ or more, the optical sensor of the invention can be implemented by an area of 0.5 $mm^2$ or less.

Advantageous Effects of Invention

As is apparent from the above, the present invention can realize an optical sensor and electronic equipment using the same capable of ensuring sufficient gain without incurring voltage drops of output signals.

Also, the present invention can realize an electronic equipment of high reliability with little operational fluctuations.

BRIEF DESCRIPTION OF DRAWINGS

The present invention will be sufficiently understood by a following detailed description and attached drawings. These drawings are only for illustrating use and never limit the invention.

DESCRIPTION OF EMBODIMENTS

Hereinbelow, an optical sensor of the present invention will be described in detail by way of embodiments thereof illustrated in the accompanying drawings.

First Embodiment

Figure 1:
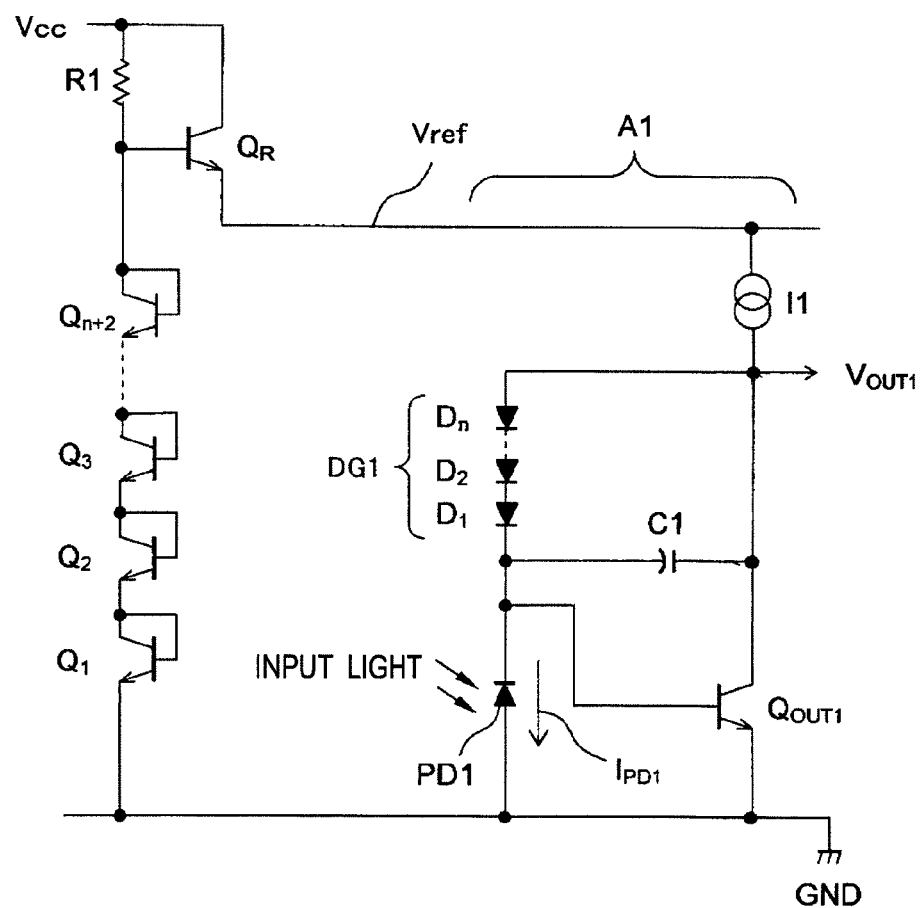
FIG. 1 is a circuit diagram of an optical sensor according to a first embodiment of the invention.

FIG. 1 is a circuit diagram of an optical sensor according to a first embodiment of the invention.

The optical sensor of the first embodiment, as shown in FIG. 1, includes an NPN transistor $Q_1$ having an emitter connected to the ground GND and a collector connected to a base, an NPN transistor $Q_2$ having a collector connected to a base, an NPN transistor $Q_3$ having a collector connected to a base, . . . , and an NPN transistor $Q_{n+2}$ (n is an integer of 2 or more) having a collector connected to a base, where the emitters are directed toward the ground GND. Then, one end of a resistor R1 is connected to the collector of the NPN transistor $Q_{n+2}$, and a power supply voltage Vcc is applied to the other end of the resistor R1. Also, the base of an NPN transistor $Q_R$ is connected to one end of the resistor R1, and the power supply voltage Vcc is applied to the collector of the NPN transistor $Q_R$. The resistor R1, the NPN transistors $Q_1$, $Q_2$, $Q_3$, . . . , $Q_{n+2}$, and the NPN transistor $Q_R$ constitute a constant voltage circuit as an example of a power supply section. The emitter of the NPN transistor $Q_R$ in this constant voltage circuit outputs a constant voltage Vref equivalent to a forward voltage of the diodes ($Q_1$, $Q_2$, $Q_3$, . . . , $Q_{n+1}$) of n+1 stages.

An anode of a photodiode PD1 is connected to the ground GND, and a cathode-side end of the series-connected diodes $D_1, D_2, \ldots, D_n$ as an example of a current-voltage conversion section is connected to a cathode of the photodiode PD1. These diodes $D_1, D_2, \ldots, D_n$ are a group of semiconductor devices having n PN junctions connected in series so that the forward direction is oriented toward the photodiode side.

Next, a base of an NPN transistor $Q_{out1}$ as an example of an grounded-emitter output transistor is connected to the cathode of the photodiode PD1, and an emitter of the NPN transistor $Q_{out1}$ is connected to the ground GND. Then, a collector of the NPN transistor $Q_{out1}$ is connected to one end of a current source I1, and the constant voltage Vref is applied to the other end of the current source I1. Also, an anode-side end of the series-connected diodes $D_1, D_2, \ldots, D_n$ is connected to the one end of the current source I1.

Further, a capacitor C1 is connected between the base and the collector of the NPN transistor $Q_{out1}$.

This optical sensor outputs an photoelectric conversion signal $V_{out1}$ from an anode-side end of the diode group DG1 including series-connected n diodes $D_1, D_2, \ldots, D_n$.

The photodiode PD1, the diode group DG1 ($D_1, D_2, \ldots, D_n$), the current source I1, the NPN transistor $Q_{out1}$, and the capacitor C1 constitute a photoelectric conversion circuit A1.

According to the optical sensor of the above-described constitution, a voltage output (photoelectric conversion signal $V_{out1}$) is obtained by the photodiode PD1 and the n-stage diodes $D_1, D_2, \ldots, D_n$. As a result, an n-times higher voltage than the conventional one can be obtained.

As shown in FIG. 1, in the constant voltage circuit (R1, $Q_1$, $Q_2$, $Q_3$, . . . , $Q_{n+2}$, $Q_R$) the power supply voltage Vcc is given to the diodes ($Q_1, Q_2, Q_3, \ldots, Q_{n+2}$) of the n+2 or more stages as well as to the resistor R1, while a point between the (n+2)-stage diodes ($Q_1, Q_2, Q_3, \ldots, Q_{n+2}$) and the resistor R1, and the base of the is NPN transistor $Q_R$ are connected to each other, by which the constant voltage Vref equivalent to the forward voltage of the (n+1)-stage diodes ($Q_1, Q_2, Q_3, \ldots, Q_{n+2}$) is obtained.

In the optical sensor of the above-described construction, with no incident light on the photodiode PD1, a base current flows from the current source I1 via the diode group DG1 ($D_1, D_2, \ldots, D_n$) to the NPN transistor $Q_{out1}$. Therefore, the voltage of the photoelectric conversion signal $V_{out1}$ becomes a voltage resulting from adding the base current-biased forward voltage of the diode group DG1 ($D_1, D_2, \ldots, D_n$) to a base—emitter voltage of the NPN transistor $Q_{out1}$. With incident light on the photodiode PD1, on the other hand, a photocurrent $I_{PD1}$ of the photodiode PD1 flows through the diode group DG1 ($D_1, D_2, \ldots, D_n$), causing the forward voltage to increase, so that the voltage level of the photoelectric conversion signal $V_{out1}$ becomes larger as compared with the case in which no incident light is present.

According to the optical sensor of the above construction, accumulating 2 or more stages of PN junctions in series by the diode group DG1 ($D_1, D_2, \ldots, D_n$) causes the voltage level of the photoelectric conversion signal to be increased by an integral multiple depending on the number of stages of the PN junctions (diodes $D_1, D_2, \ldots, D_n$). Accordingly, it becomes possible to ensure sufficient gain without incurring voltage drops of outputted photoelectric conversion signals.

Generally, a construction for performing current-voltage conversion can be implemented by connecting n-stage PN junctions to the photodiode PD1 within a semiconductor substrate on which the constant voltage circuit (R1, $Q_1$, $Q_2$, $Q_3$, . . . , $Q_{n+2}$, $Q_R$) is formed. Thus, forming the constant voltage circuit and the photoelectric conversion circuit A1 on one semiconductor substrate makes it possible to reduce the chip area and therefore realize an optical sensor of smaller size and lower cost, as compared with cases in which a large resistor is used in the current-voltage conversion section.

Figure 4:
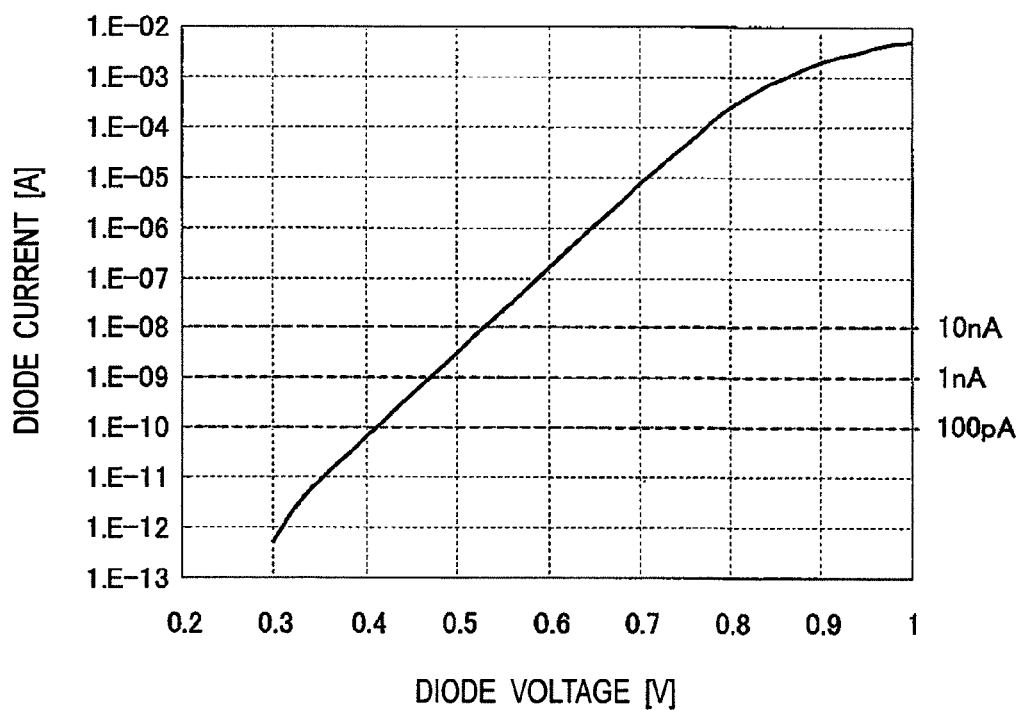
FIG. 4 is a chart showing a diode voltage-current characteristic.

In addition, since the forward voltage of a diode fluctuates depending on the current value as shown in FIG. 4, giving a flow of about 0.1 mA-1 mA through the constant voltage circuit-side diodes (NPN transistors $Q_1$, $Q_2$, $Q_3$, . . . , $Q_{n+2}$) allows a voltage of 0.8 V per stage to be obtained.

Figure 2:
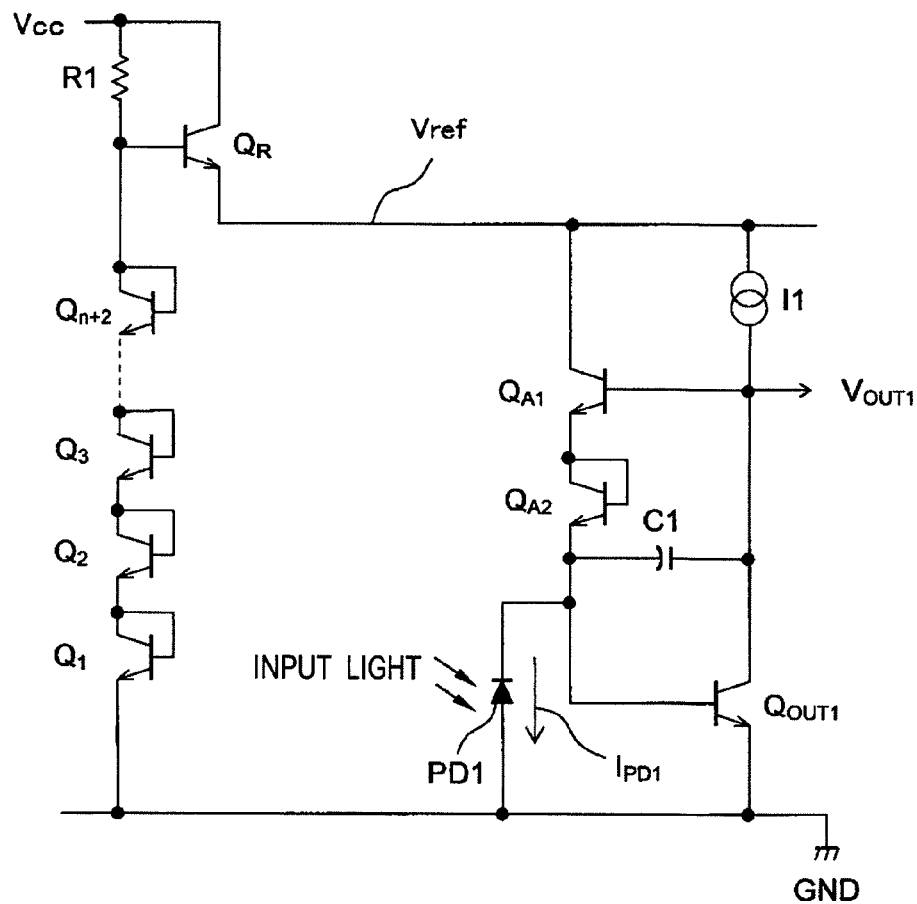
FIG. 2 is a circuit diagram showing an example using transistors in the optical sensor.

Conversely, adjusting the photodiode size so that the photocurrent $I_{PD1}$ of the photodiode PD1 becomes about 1 nA-10 nA allows a voltage of 0.5 V per stage to be obtained in the photoelectric conversion circuit A1-side diodes ($D_1, D_2, \ldots, D_n$). Thus, a voltage difference of about 0.8 V–0.5 V=0.3 V per stage can be yielded. For example, even if the constant voltage Vref is 3 $V_{BE}$ and the photoelectric conversion signal $V_{out1}$ is also 3 $V_{BE}$ as shown in FIG. 2, there occurs a voltage likelihood of 0.3 V×2=0.6 V corresponding to 2 stages of $V_{BE}$ of the transistors $Q_{A1}$, $Q_{A2}$, making it possible to fulfill a voltage output to the succeeding stage.

Figure 3:
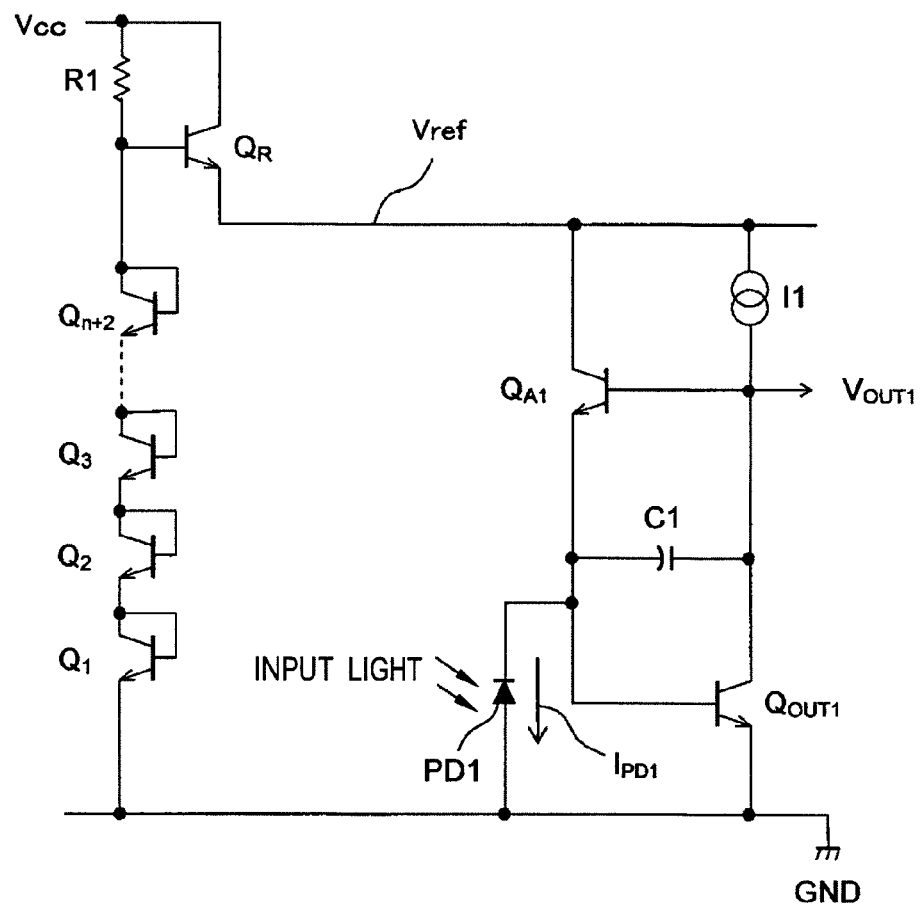
FIG. 3 is a circuit diagram of an optical sensor according to a comparative example.

FIG. 3 is a circuit diagram of an optical sensor according to a comparative example. In the optical sensor of this comparative example, with a current-voltage conversion section yielding a voltage of 0.5 V for one transistor stage at normal temperature, the voltage level largely lowers to as low as 0.3 V at high temperatures, incapable of obtaining a sufficient output voltage. However, providing a plurality of stages of PN junctions in the current-voltage conversion section as shown in FIGS. 1 and 2 makes it possible to yield two times or more output voltages.

Second Embodiment

Figure 5:
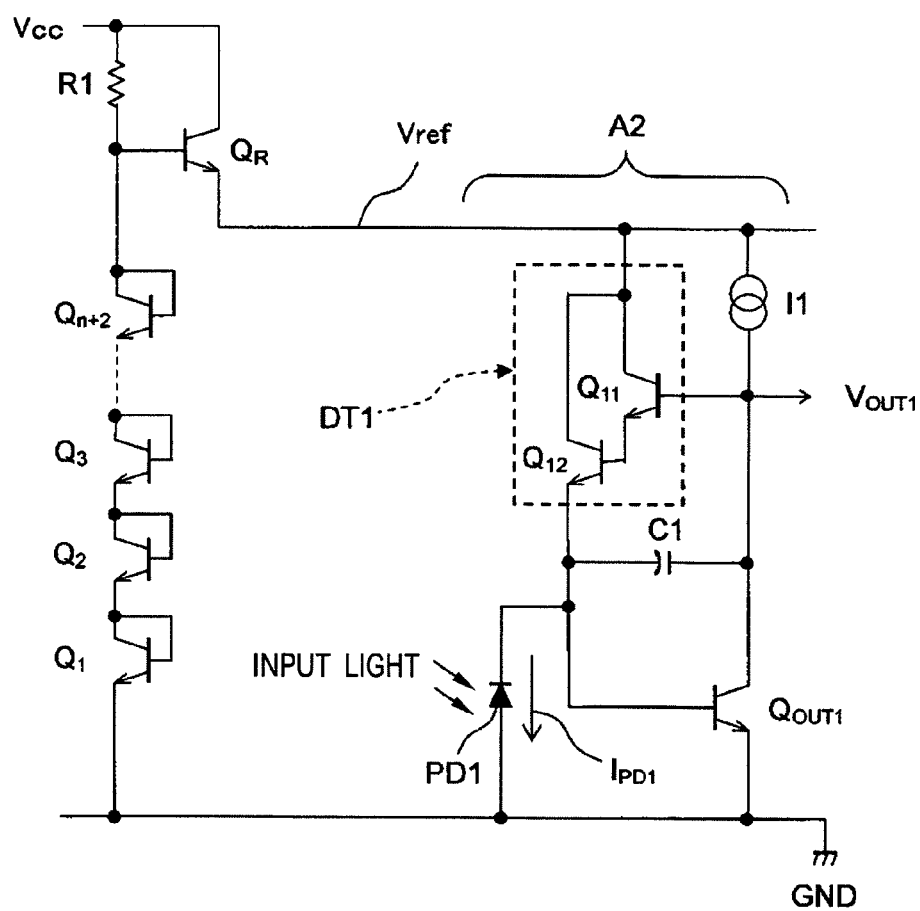
FIG. 5 is a circuit diagram of an optical sensor according to a second embodiment of the invention.

FIG. 5 is a circuit diagram of an optical sensor according to a second embodiment of the invention. The optical sensor of this second embodiment is similar in construction to the optical sensor of the first embodiment except the Darlington transistor, and so like component members are designated by like reference signs.

In this optical sensor of the second embodiment, as shown in FIG. 5, an emitter of an output-stage NPN transistor $Q_R$ in the constant voltage circuit is connected to a collector of a Darlington transistor DT1, and an emitter of the Darlington transistor DT1 is connected to a cathode of a photodiode PD1. Then, a base of the Darlington transistor DT1 is connected to a collector of an NPN transistor $Q_{out1}$.

The Darlington transistor DT1 has an first-stage NPN transistor $Q_{11}$ having a base connected to the collector of the NPN transistor $Q_{out1}$, and an output-stage NPN transistor $Q_{12}$ having a base connected to the emitter of the NPN transistor $Q_{11}$ and a collector connected to the collector of the NPN transistor $Q_{11}$.

The photodiode PD1, the Darlington transistor DT1, the current source I1, the NPN transistor $Q_{out1}$, and the capacitor C1 constitute a photoelectric conversion circuit A2.

The optical sensor of the second embodiment has the same effects as those of the optical sensor of the first embodiment.

Also according to the optical sensor of the above-described construction, by making up a circuit construction in which the current-voltage conversion section is fulfilled by the Darlington transistor DT1 with the base of the Darlington transistor DT1 serving as an output, given a thermal voltage $V_T$ of each of the first-stage NPN transistor $Q_{11}$ and the output-stage NPN transistor $Q_{12}$, a base-emitter voltage $V_{BE}$, and a current amplification factor hfe, a voltage of an outputted photoelectric conversion signal is:

$$2V_{BE} - V_T \times \ln(hfe).$$

Therefore, the voltage of the photoelectric conversion signal can be lowered by several tens of mV—several hundreds of mV, making it possible to achieve voltage adjustment.

Third Embodiment

Figure 6:
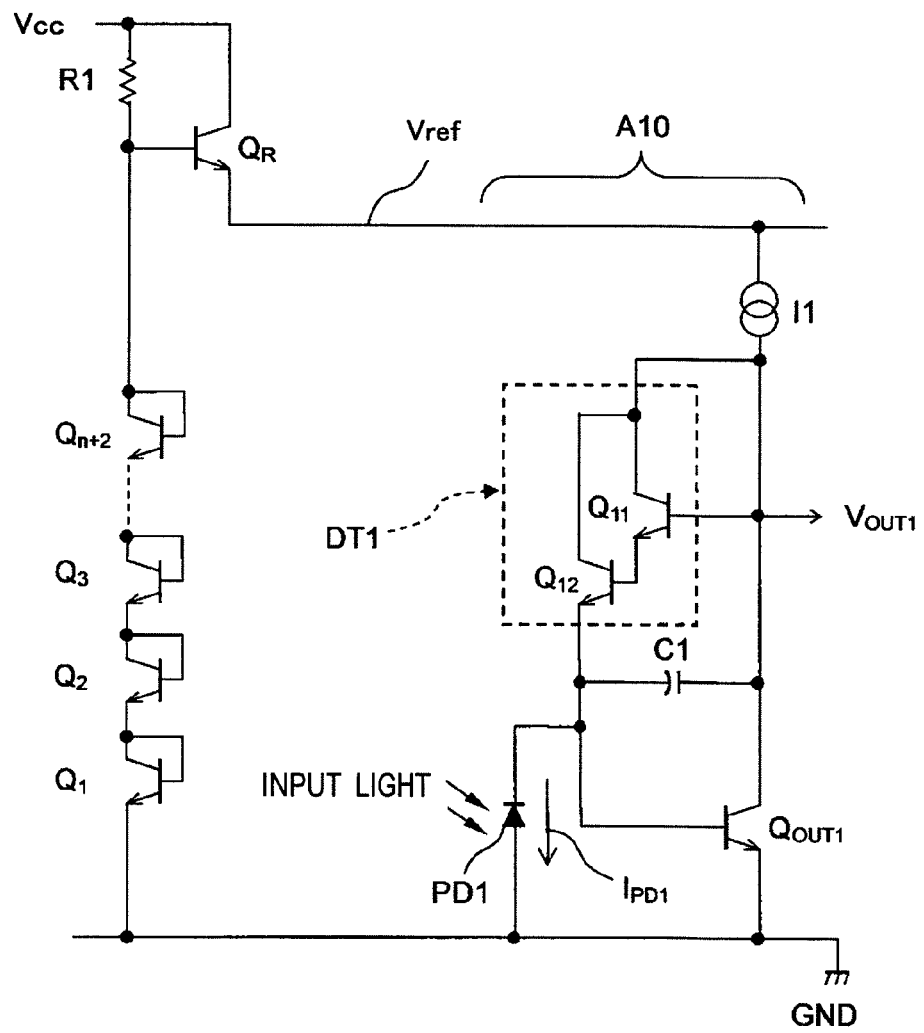
FIG. 6 is a circuit diagram of an optical sensor according to a third embodiment of the invention.

FIG. 6 is a circuit diagram of an optical sensor according to a third embodiment of the invention. The optical sensor of this third embodiment is similar in construction to the optical sensor of the second embodiment except connection points to the current source circuit for feed to the Darlington transistor DT1, and so like component members are designated by like reference signs.

In this optical sensor of the third embodiment, as shown in FIG. 6, a collector of the Darlington transistor DT1 is connected to the connecting point between one end of the current source I1 and the collector of the NPN transistor $Q_{out1}$.

The photodiode PD1, the Darlington transistor DT1, the current source I1, the NPN transistor $Q_{out1}$, and the capacitor C1 constitute a photoelectric conversion circuit A10.

The optical sensor of the third embodiment has the same effects as those of the optical sensor of the second embodiment.

Also according to the optical sensor of the above-described construction, a start-up time, which is a time period taken until normal operation is fulfilled at a rise of the power supply voltage Vcc, can be shortened. An explanation of this is given below.

In the second embodiment, the voltage Vref derived from the power supply section (R1, $Q_1, Q_2, Q_3, \ldots, Q_{n+2}, Q_R$) also rises along with the rise of the power supply voltage Vcc. In this case, the moment the power supply voltage Vcc rises, the base potential of the NPN transistor $Q_{out1}$ instantly rises owing to a parasitic capacitance (collector-emitter capacitance) of the NPN transistor $Q_{12}$ and a parasitic capacitance between the base of the NPN transistor $Q_{out1}$ and the ground. The instantaneous rising of the base potential of the NPN transistor $Q_{out1}$ causes a drop of the base potential of the NPN transistor $Q_{11}$ as well as a drop of the base potential of the NPN transistor $Q_{12}$. Whereas a bias current to restore the drop of the base potential to a normal potential state is a bias current that flows through the NPN transistors $Q_{11}$ and $Q_{12}$, this bias current, when being a small current, takes time to restore the base potential. For these reasons, the start-up time (time taken until normal operation is fulfilled at a rise of the power supply voltage Vcc) may be elongated.

Therefore, as a means for solving the issue of increase in the start-up time, as in FIG. 6, the collector of the Darlington transistor DT1 is connected to the connecting point between one end of the current source I1 and the collector of the NPN transistor $Q_{out1}$. As a result of this, the collector potential of the Darlington transistor DT1 is no longer directly linked with the potential rise of the constant voltage Vref. Thus, instantaneous rise of the base potential of the NPN transistor $Q_{out1}$ decreases and the drop of the base potential of the NPN transistor $Q_{11}$ is suppressed, while the drop of the base potential of the NPN transistor $Q_{12}$ is suppressed, so that the start-up time (time until normal operation is fulfilled at a rise of the power supply voltage Vcc) can be shortened.

In the example of the third embodiment, the collector of the NPN transistors $Q_{11}$ and $Q_{12}$, which is the collector of the Darlington transistor DT1, is connected to the connecting point between one end of the current source I1 and the collector of the NPN transistor $Q_{out1}$. However, the same effects as described above can be obtained also when the collector of the NPN transistor $Q_{11}$ is connected to the emitter of the output-stage NPN transistor $Q_R$ of the constant voltage circuit while only the collector of the NPN transistor $Q_{12}$ is connected to the connecting point between one end of the current source I1 and the collector of the NPN transistor $Q_{out1}$.

Fourth Embodiment

Figure 7:
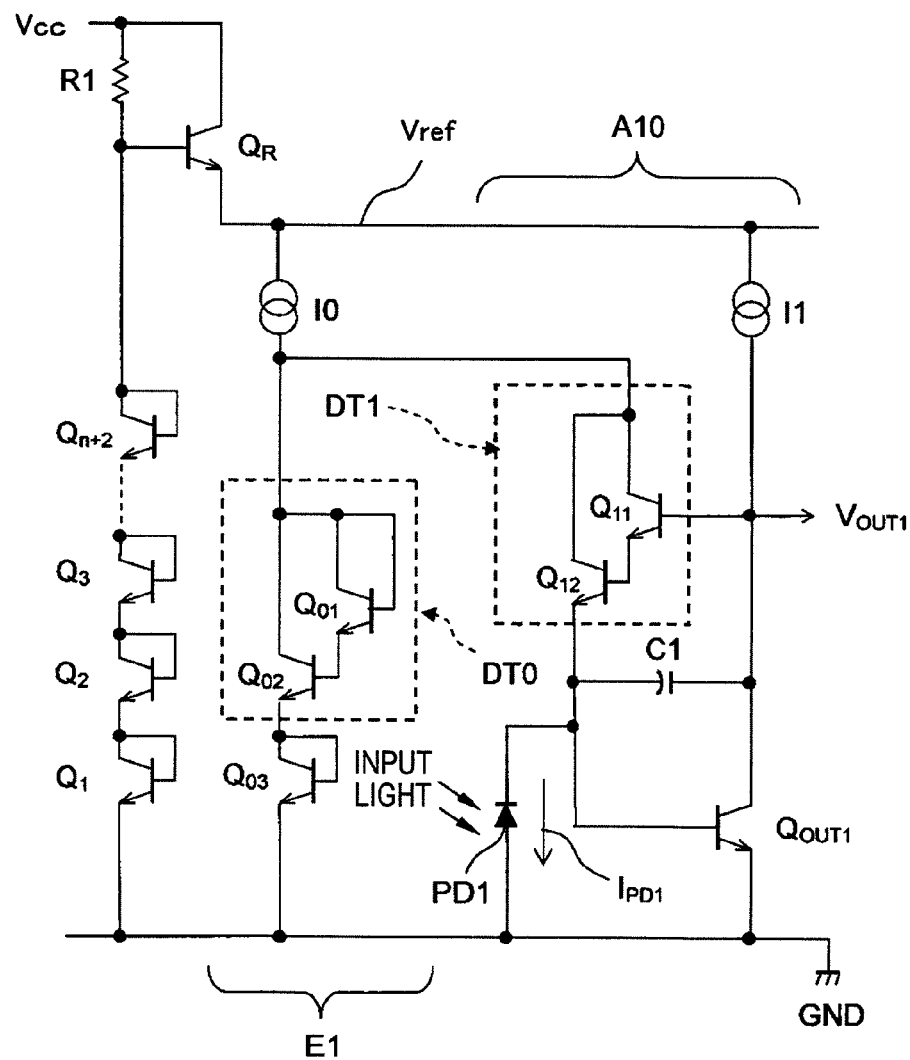
FIG. 7 is a circuit diagram of an optical sensor according to a fourth embodiment of the invention.

FIG. 7 is a circuit diagram of an optical sensor according to a fourth embodiment of the invention. The optical sensor of this fourth embodiment is similar in construction to the optical sensor of the third embodiment except the current source circuit for feed to the Darlington transistor, and so like component members are designated by like reference signs.

In the optical sensor of this fourth embodiment, as shown in FIG. 7, a current source circuit E1 exclusively for the Darlington transistor DT1 is connected to the collector of the Darlington transistor DT1.

The current source circuit E1 has an NPN transistor $Q_{03}$ having an emitter grounded with a base and a collector connected together, a Darlington transistor DT0 having an emitter connected to the collector of the NPN transistor $Q_{03}$, and a current source I0 in which one end is connected to a collector of the Darlington transistor DT0 while a constant voltage Vref is applied to the other end. The Darlington transistor DT0 has a first-stage NPN transistor $Q_{01}$ having a collector and a base both connected to one end of the current source I0, and an output-stage NPN transistor $Q_{02}$ having a base connected to the emitter of the NPN transistor $Q_{04}$ and a collector connected to the collector of the NPN transistor $Q_{01}$.

The optical sensor of the fourth embodiment has the same effects as those of the optical sensor of the third embodiment.

In the third embodiment, a current that is let to flow through the Darlington transistor DT1 is fed from the current source I1, while the current source I1 also feeds a bias current for the grounded-emitter NPN transistor $Q_{out1}$. Therefore, when the photodiode PD1 with input light coming thereon has a photocurrent $I_{PD1}$ flowing therethrough so that a current flows through the Darlington transistor DT1, the bias current of the NPN transistor $Q_{out1}$ decreases to an extent corresponding to the current flowing through the Darlington transistor DT1. This causes deteriorations of AC characteristics of the photoelectric conversion circuit A10, and for prevention of an increased photocurrent $I_{PD1}$ of the photodiode PD1 that leads to exhaust of the bias current of the NPN transistor $Q_{out1}$, there is a need for increasing the current of the current source I1.

Thus, as a means for solving the above problem, the current that is let to flow through the Darlington transistor DT1 is fed from an exclusive current source circuit E1 as shown in FIG. 7. In the example of FIG. 7, the Darlington transistor DT0 made up of the current source I0 and the NPN transistors $Q_{01}$, $Q_{02}$ as well as the diode-connected NPN transistor $Q_{03}$ are connected in series between the constant voltage Vref and the ground GND, so that the current is fed to the Darlington transistor DT1 from the connecting point between the current source I0 and the Darlington transistor DT0. A circuit section constituted by the NPN transistors $Q_{01}$, $Q_{02}$, $Q_{03}$ is so adjusted that the current source I0 and the Darlington transistor DT1 are prevented from being saturated.

Fifth Embodiment

Figure 8:
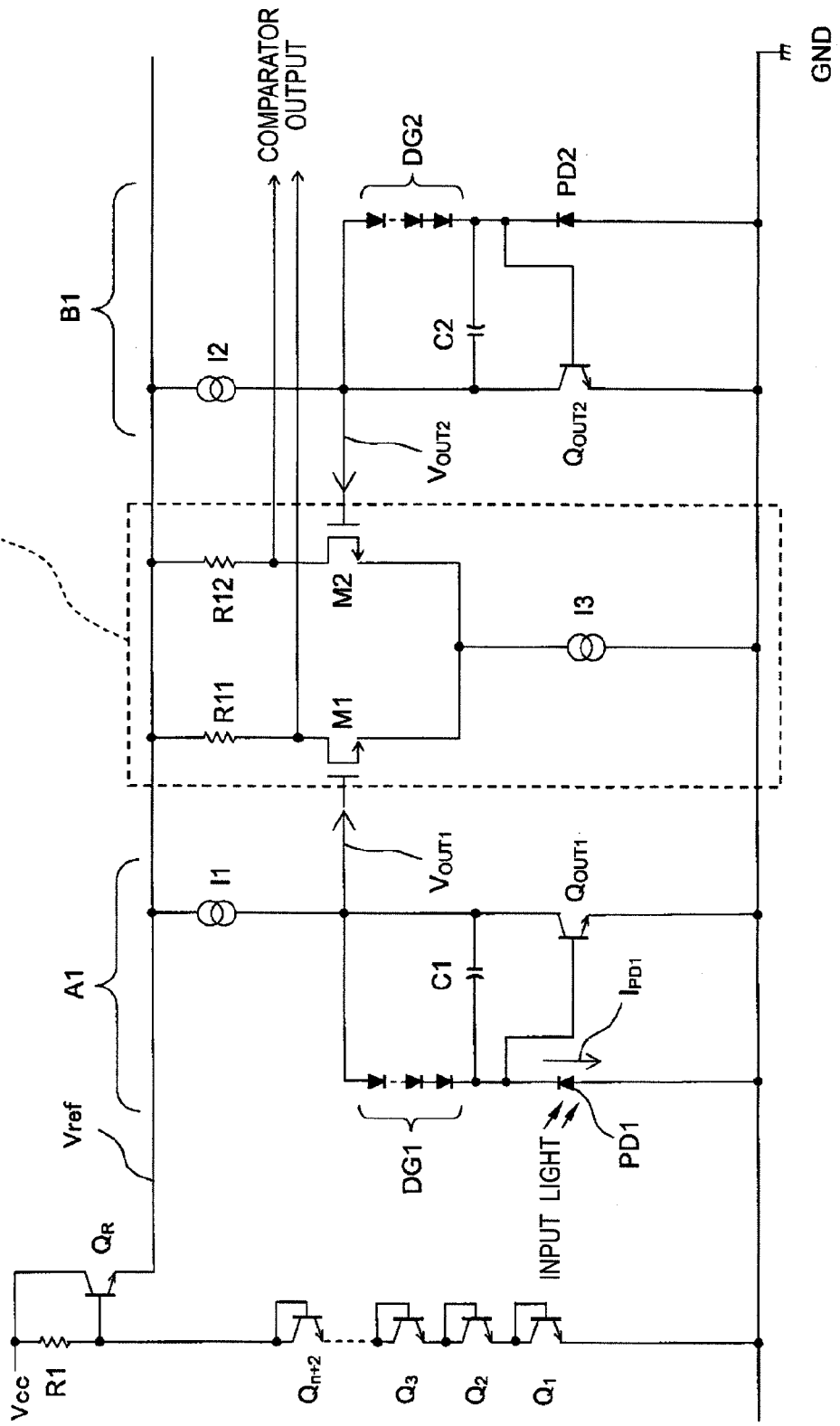
FIG. 8 is a circuit diagram of an optical sensor according to a fifth embodiment of the invention.

FIG. 8 is a circuit diagram of an optical sensor according to a fifth embodiment of the invention. The optical sensor of this fifth embodiment, in which a mover having a slit between a light-emitting element and light-receiving element is provided, is used in a light receiving circuit of optical encoders for reading slit operations of the mover.

The optical sensor of the fifth embodiment includes the constant voltage circuit (resistor R1, NPN transistors $Q_1$, $Q_2$, $Q_3$, ..., $Q_{n+2}$ and NPN transistor $Q_R$) shown in FIG. 1 of the first embodiment and the first photoelectric conversion circuit A1 shown in FIG. 1, a comparator CMP1 and a second photoelectric conversion circuit B1 having the same construction as the photoelectric conversion circuit A1.

The second photoelectric conversion circuit B1 is composed of a photodiode PD2, a diode group DG2, an NPN transistor $Q_{OUT2}$, a current source I2, and a capacitor C2. The comparator CMP1 is composed of resistors R11, R12, MOS transistors M1, M2 and a current source I3 formed of a MOS element.

According to the optical sensor of the above-described construction, as shown in FIG. 8, a voltage output (photoelectric conversion signal) derived from current-voltage conversion by the first, second photoelectric conversion circuits A1, B1 can be inputted to the comparator CMP1, thus making it possible to fulfill voltage amplification and A/D conversion.

Also, respective photoelectric conversion signals from the two photoelectric conversion circuits A1, B1 can be inputted to the comparator CMP1 formed of a MOS element, by which an output voltage of the comparator CMP1 can be ensured even at high temperature by the input section of the comparator CMP1 and the MOS element of the constant current section.

Figure 9:
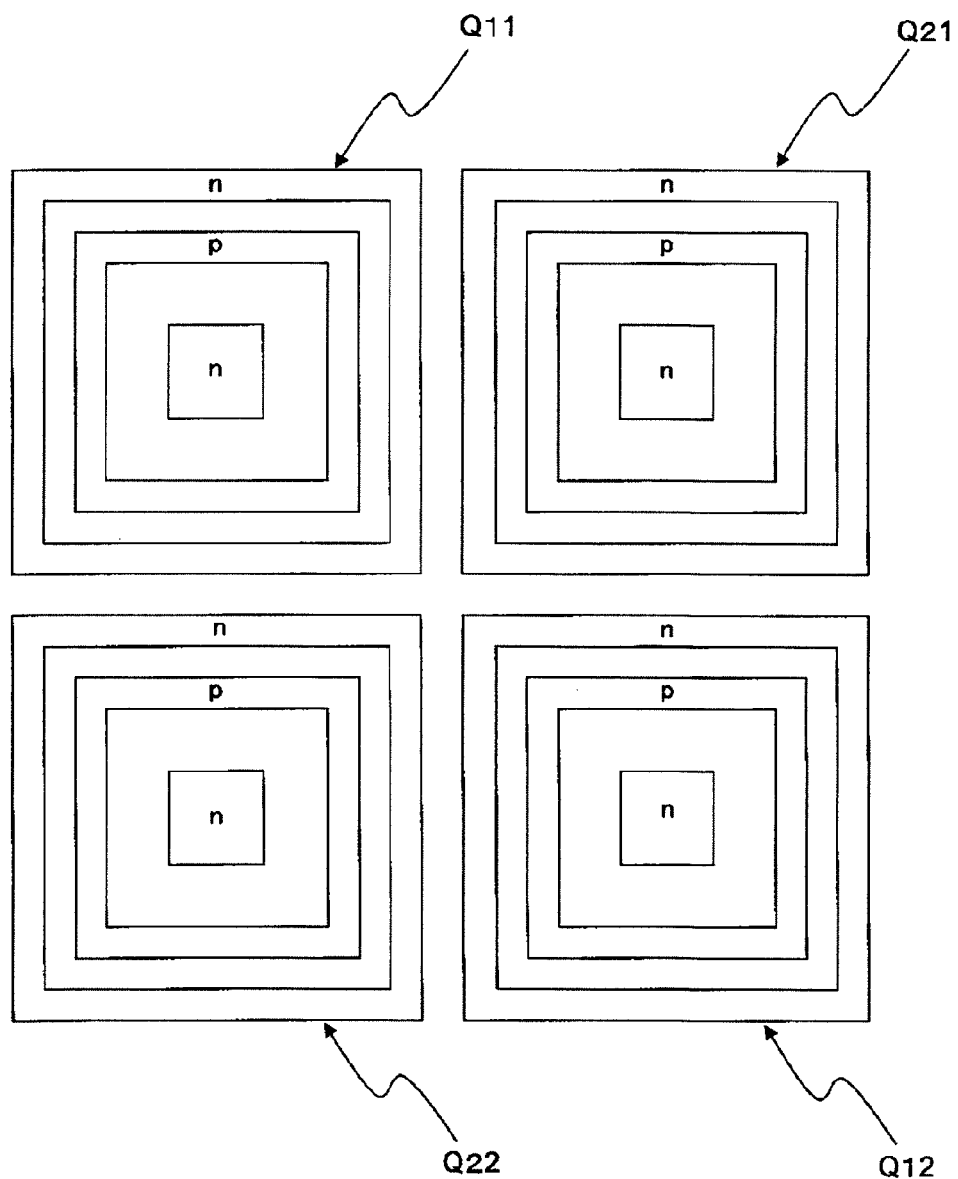
FIG. 9 is a plan view showing a cross arrangement of first-stage transistors and output-stage transistors of a Darlington transistor.

In a case where photoelectric conversion is performed with n=2 stages set for the diode groups DG1, DG2 of the photoelectric conversion circuits A1, B1 in FIG. 8, taking the case of the two-stage Darlington transistors shown in FIG. 5 as an example, there are provided on a semiconductor substrate, in an alternately-crossing arrangement, a first-stage transistor $Q_{11}$ and an output-stage transistor $Q_{12}$ of the Darlington transistor in one photoelectric conversion circuit, as well as a first-stage transistor $Q_{21}$ and an output-stage transistor $Q_{22}$ of the Darlington transistor in the other photoelectric conversion circuit, as shown in FIG. 9.

In this case, the first-stage transistor and the output-stage transistor of the Darlington transistor are so constructed that an n-type diffusion region of the outermost periphery is a collector, a p-type diffusion region of its inner side is a base, and an n-type diffusion region of the innermost side is an emitter to make up a transistor (diode) with the base and emitter connected together.

By virtue of the placement that the first-stage transistor and the output-stage transistor to make up each Darlington transistor of the two photoelectric conversion circuits are set into an alternately-crossing arrangement on the semiconductor substrate as shown above, it becomes possible to suppress variations in injection of impurities by diffusion into the n-type diffusion region or the p-type diffusion region as well as variations in patterning on the wafer.

For explanation of the crossing arrangement, a Darlington transistor of a two-stage construction has been shown above as an example. Instead, the transistor may also be replaced with two diodes connected in series or with two series-connected transistors of diode connection.

Sixth Embodiment

Figure 10:
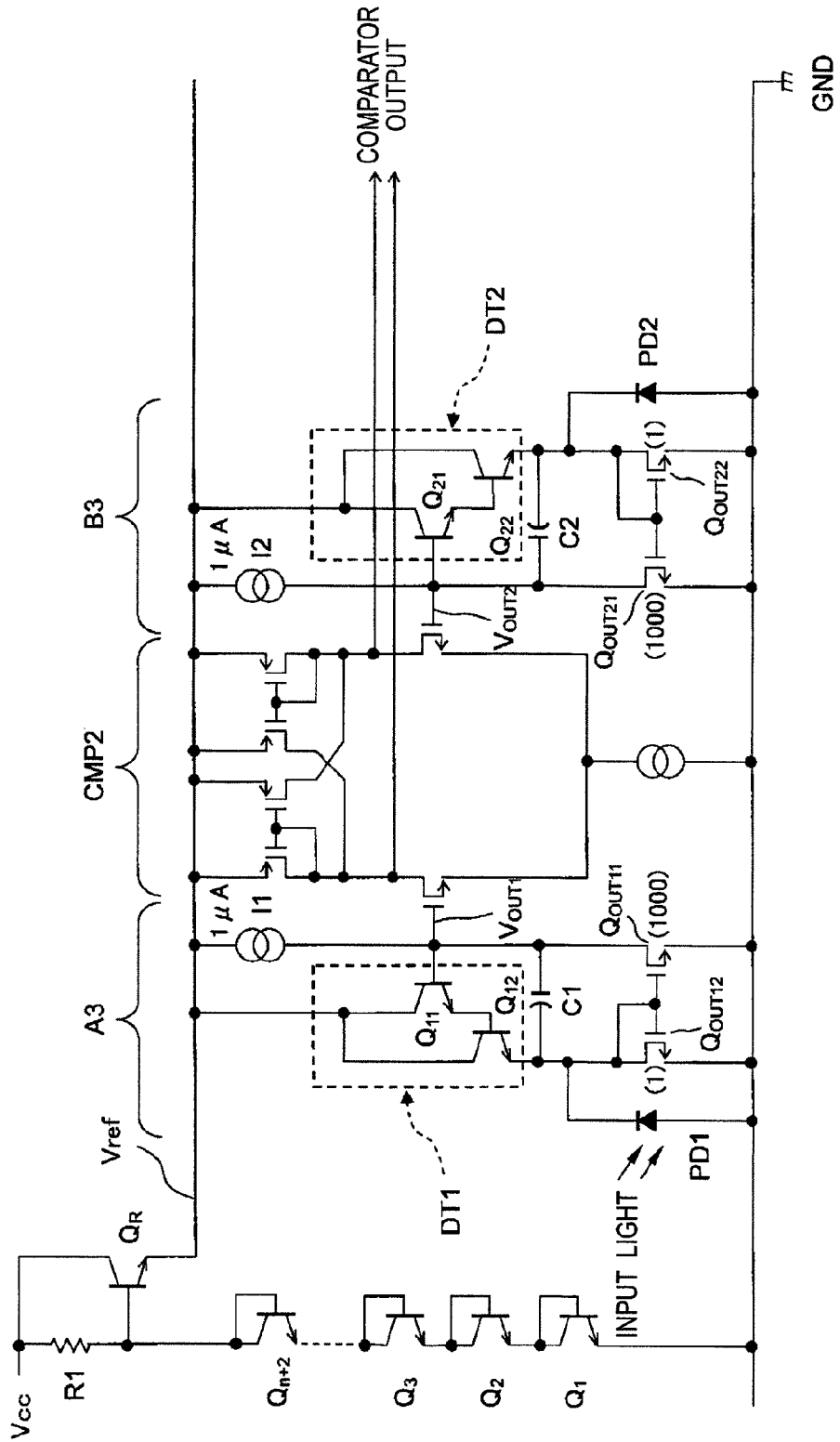
FIG. 10 is a circuit diagram of an optical sensor according to a sixth embodiment of the invention.

FIG. 10 is a circuit diagram of an optical sensor according to a sixth embodiment of the invention. The optical sensor of this sixth embodiment includes the constant voltage circuit (resistor R1, NPN transistors $Q_1$, $Q_2$, $Q_3$, ..., $Q_{n+2}$ and NPN transistor $Q_R$) shown in FIG. 1 of the first embodiment, a photoelectric conversion circuit A3, a comparator CMP2 and a photoelectric conversion circuit B3 having the same construction as the photoelectric conversion circuit A3. A photoelectric conversion signal $V_{OUT1}$ derived from the photoelectric conversion circuit A3 is inputted to one input terminal of the comparator CMP2, while a photoelectric conversion signal $V_{OUT2}$ derived from the photoelectric conversion circuit B3 is inputted to the other input terminal of the comparator CMP2.

This photoelectric conversion circuit A3 is similar in construction to the photoelectric conversion circuit A2 of the second embodiment except the NPN transistors $Q_{OUT11}$, $Q_{OUT12}$, and so like component members are designated by like reference signs.

In the photoelectric conversion circuit A3, a drain of a MOS transistor $Q_{OUT11}$ as an example of an output transistor is connected to the base of the Darlington transistor DT1, while a source of the MOS transistor $Q_{OUT11}$ is connected to the ground. Also, a gate of the MOS transistor $Q_{OUT11}$ is connected to the cathode of the photodiode PD1. Further, a drain of the MOS transistor $Q_{OUT12}$ as an example of a current mirror-use transistor is connected to the cathode of the photodiode PD1, while a gate of the MOS transistor $Q_{OUT12}$ is connected to the gate of the MOS transistor $Q_{OUT11}$. A source of the MOS transistor $Q_{OUT12}$ is connected to the ground.

The Darlington transistor DT1 and the NPN transistors $Q_{out11}$, $Q_{out12}$ constitute a Wilson-type current mirror circuit. Also, the Darlington transistor DT2 and the NPN transistors $Q_{out21}$, $Q_{out22}$ constitute a Wilson-type current mirror circuit.

The comparator CMP2 is a general comparator in which a current mirror circuit formed of MOS transistors is used as a current source load, and so its description is omitted.

As shown in FIG. 10, the photodiodes PD1, PD2 are used in diode part for base current compensation in the Wilson-type current mirror circuit, where given a current source I1 of 1 µA, as an example, the mirror ratio is set to 1000:1 and the current that flows through the MOS transistor $Q_{OUT12}$ is set to 1 nA, by which gain adjustment for photoelectric conversion becomes implementable.

In addition, in the makeup of the Wilson-type current mirror circuit by MOS transistors in the photoelectric conversion circuits A3, B3, the mirror ratio is determined depending on the gate size ratio.

For higher sensitivity of the photoelectric conversion circuits A3, B3, the photodiode current with no light input needs to be on the order of nA, consequently currents flowing through respective current mirror circuits vary, to cause larger variations of those photoelectric conversion circuits.

Figure 11:
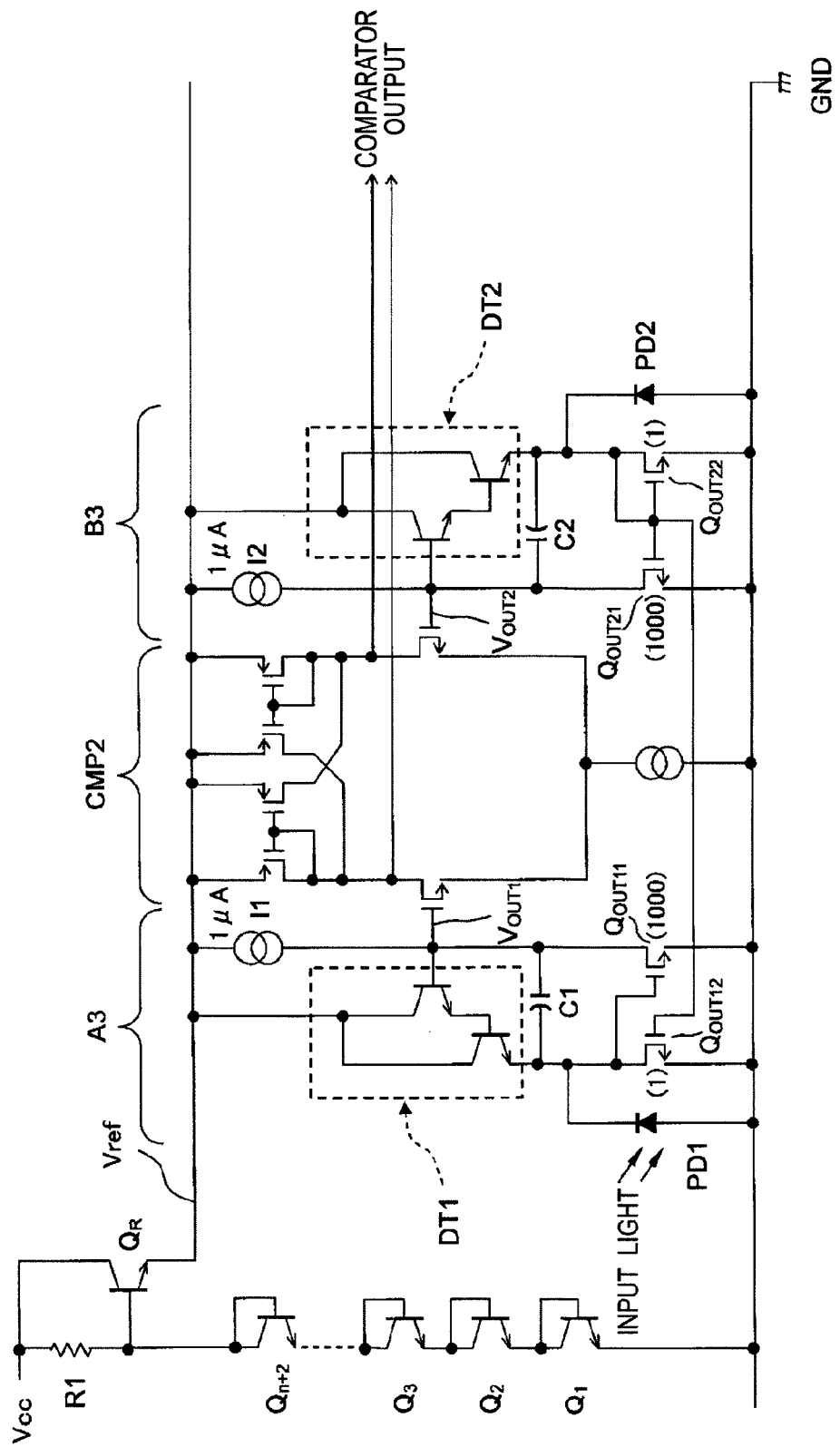
FIG. 11 is a circuit diagram showing a modification of the optical sensor.

For this reason, as shown in FIG. 11, the gate of the MOS transistor $Q_{OUT12}$ in the photoelectric conversion circuit A3 is not connected to the gate of the MOS transistor $Q_{OUT11}$ but connected to the gate of the MOS transistor $Q_{out22}$ in the photoelectric conversion circuit B3. Thus, setting the gate potential, which serves as a reference for Wilson-type current mirror circuits, common between the photoelectric conversion circuits A3, B3 makes it possible to suppress variations in characteristics of the photoelectric conversion circuits A3, B3.

Figure 12:
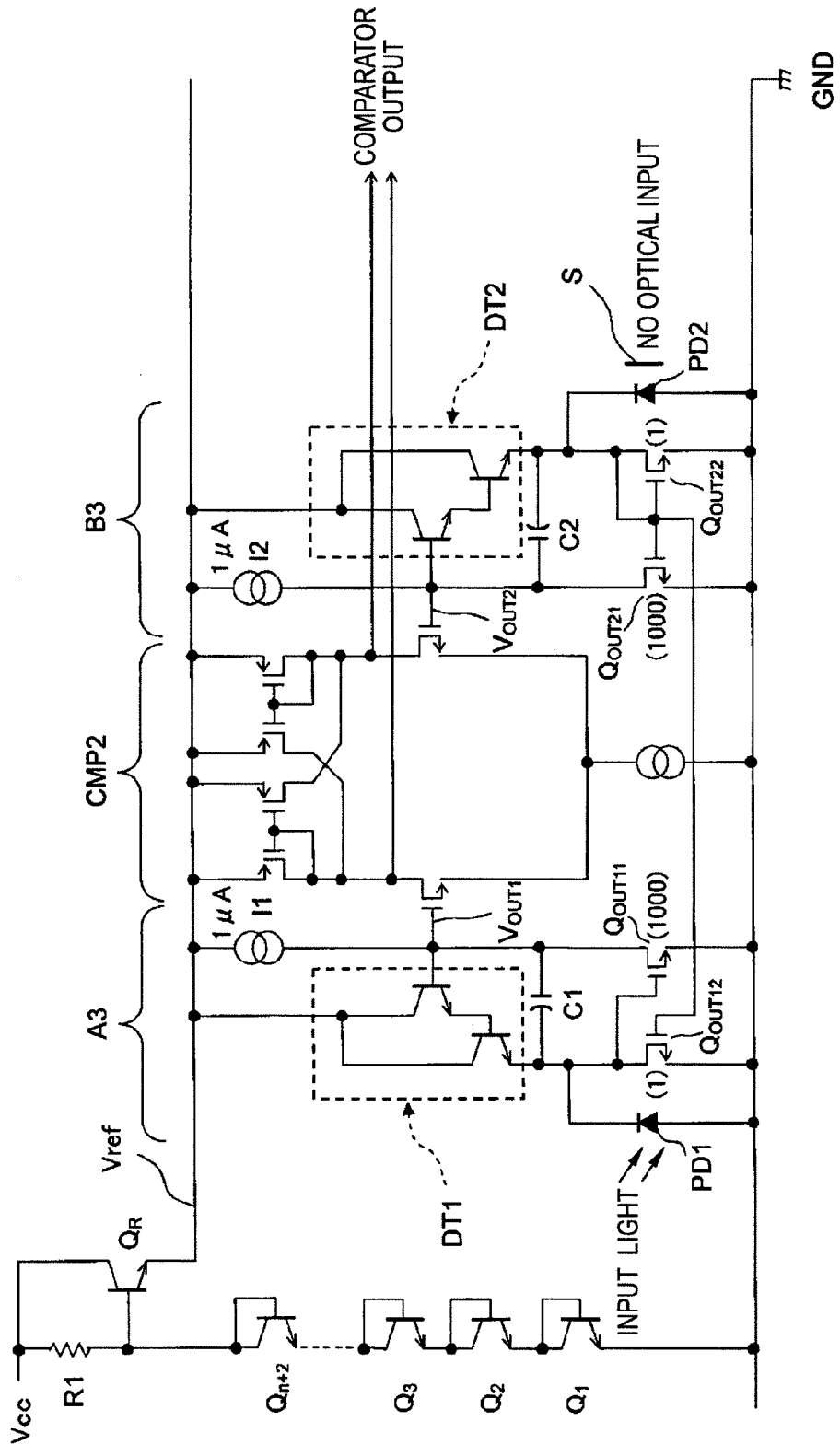
FIG. 12 is a circuit diagram showing another modification of the optical sensor.
Figure 13:
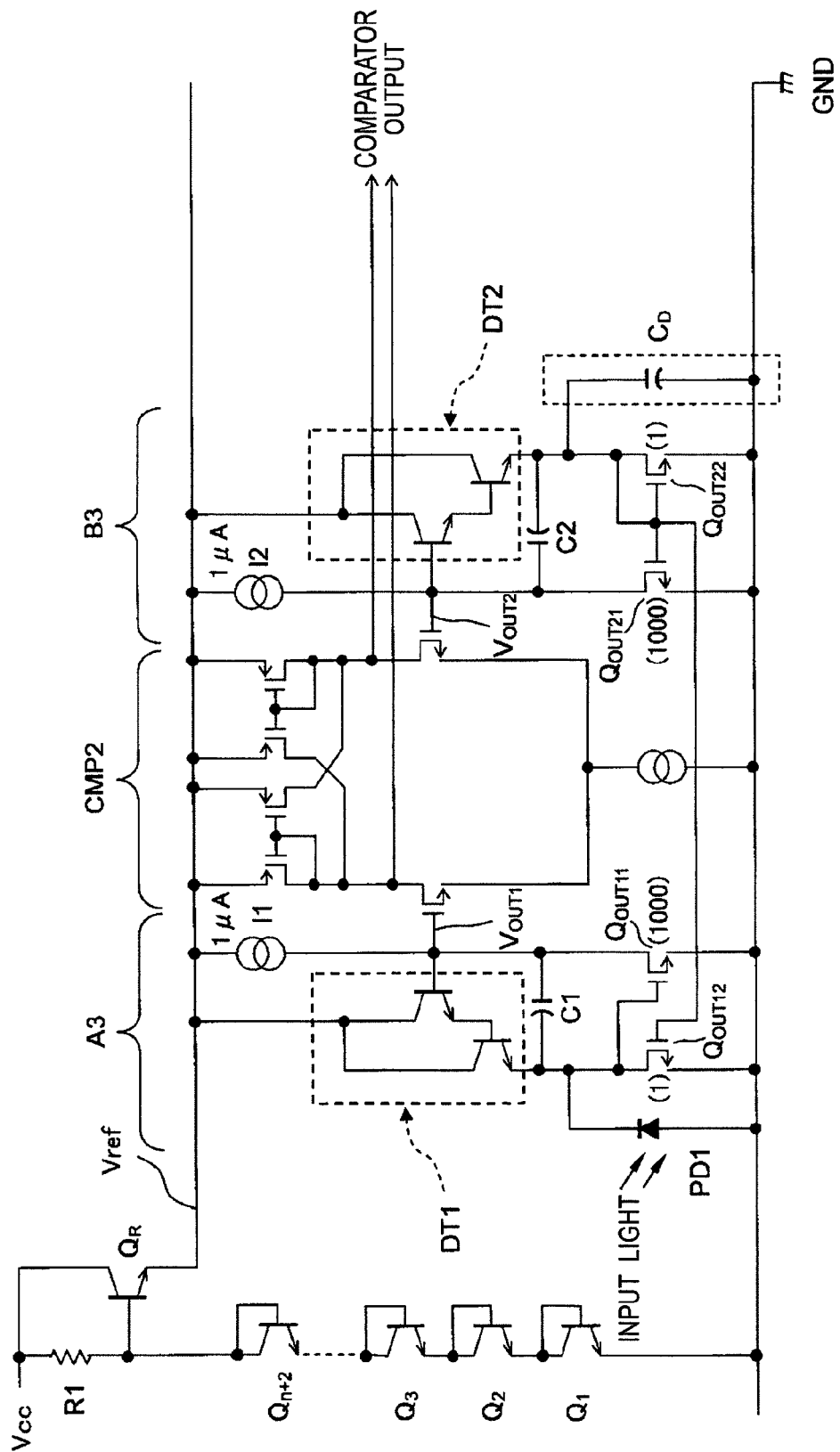
FIG. 13 is a circuit diagram showing another modification of the optical sensor using a dummy capacitor.

Other than those involving comparison of strength of neighboring rays of light such as in optical encoders, in photodiode interrupters for use of object detection or in sensors using one photodiode such as photocouplers and illuminance sensors, one-side part is implemented by a dummy photodiode or dummy capacitance, so that a reference current is made on the dummy side that serves as a reference as shown in FIG. 12, entirely eliminating effects of light-quantity dependence. In this case, the dummy side in FIG. 12 may also be a dummy photodiode, i.e., not the photodiode PD2 shielded from input light by a shielding part S, but a dummy capacitance $C_D$ of a similar size (see FIG. 13).

Figure 14:
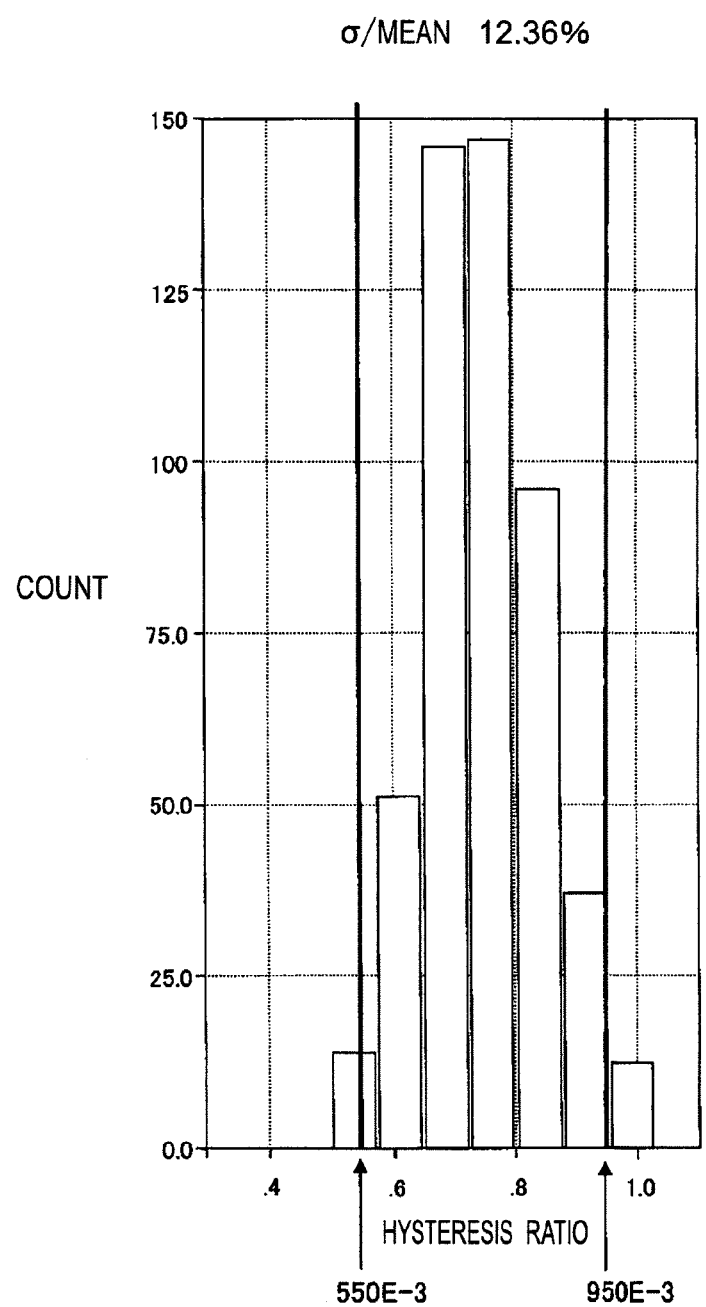
FIG. 14 is an example showing a simulation result of a prior-art optical sensor.
Figure 15:
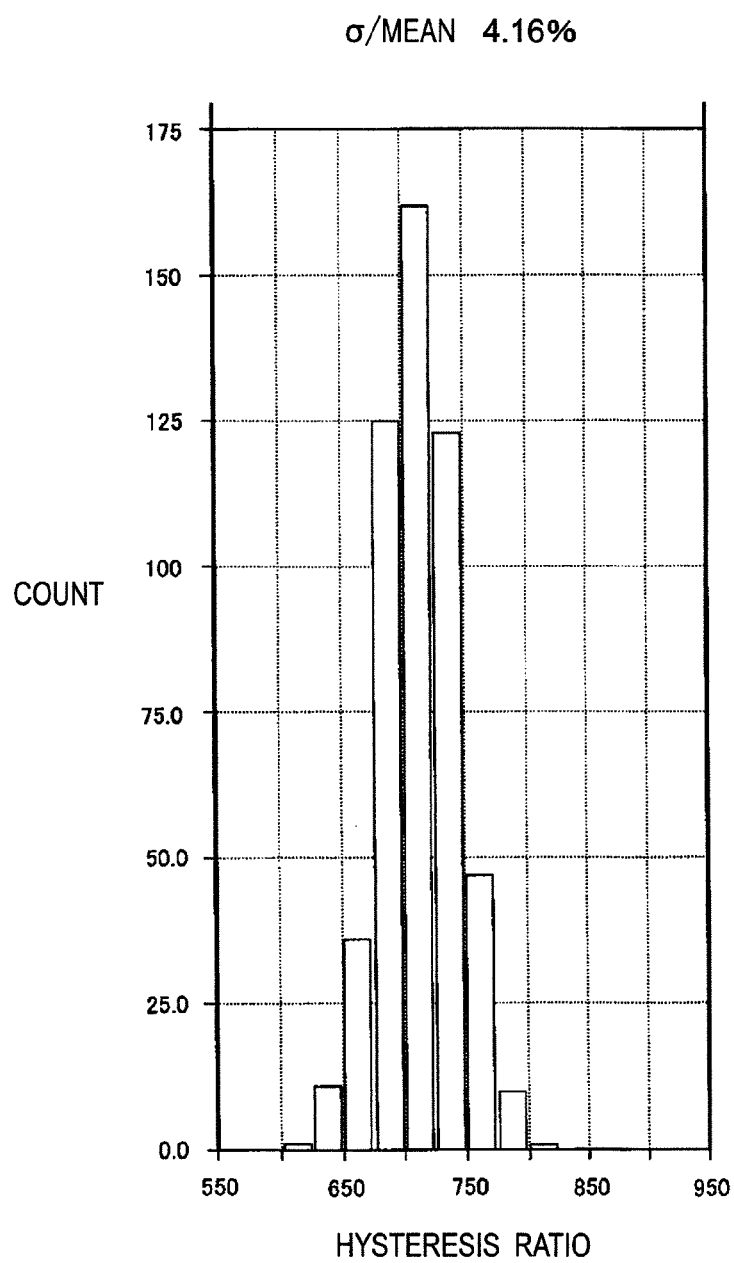
FIG. 15 is an example showing a simulation result of the invention optical sensor.
Figure 16:
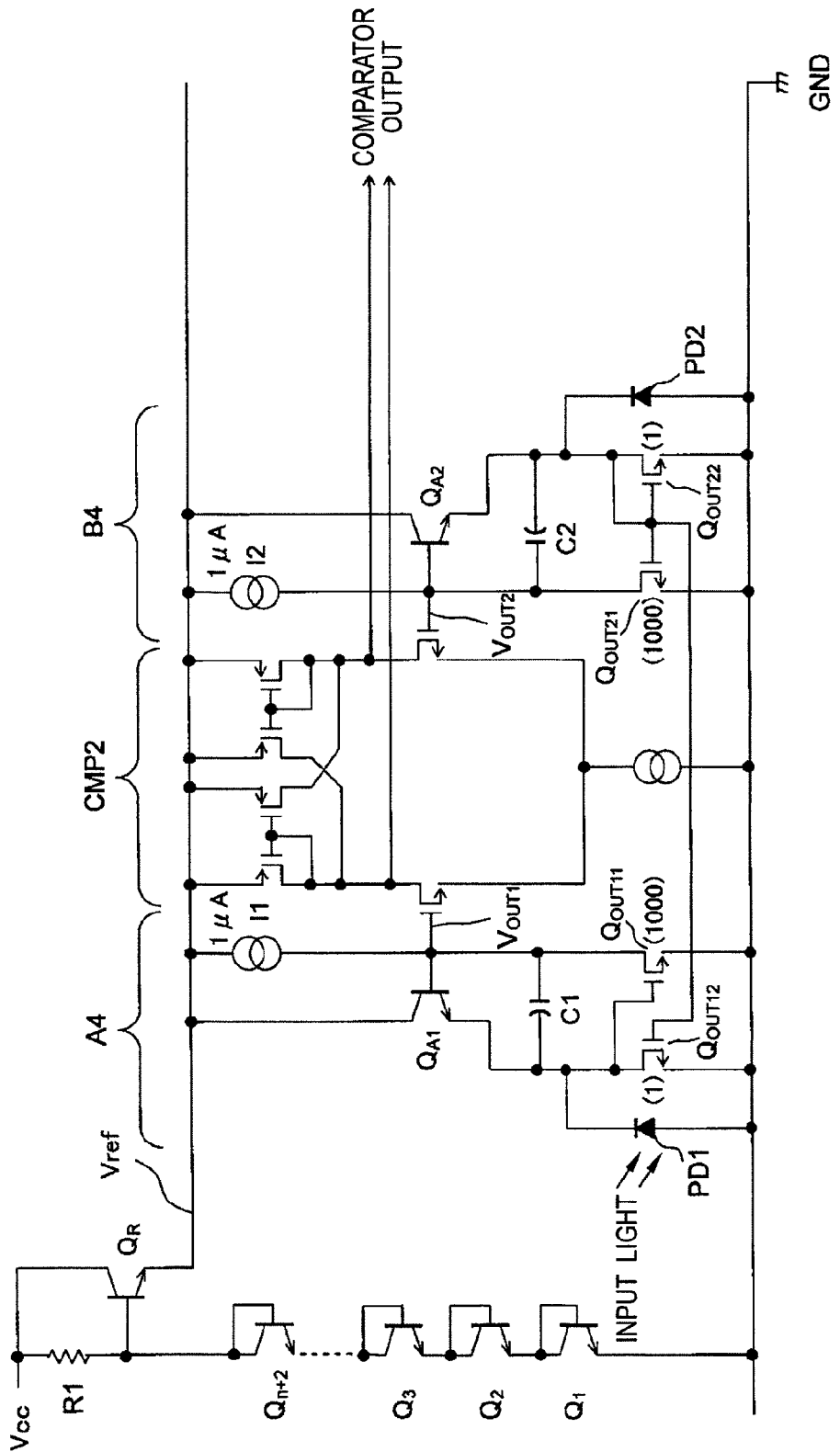
FIG. 16 is a circuit diagram of a comparative optical sensor.

FIGS. 14 and 15 show simulation results (105° C.) of improvement in terms of hysteresis characteristic in comparator outputs with input voltage level adjusted by introduction of a plural stages of diodes according to the invention as shown above. FIG. 14 shows a simulation result of an optical sensor according to a comparative example shown in FIG. 16, and FIG. 15 shows a simulation result of the optical sensor shown in FIG. 11. The optical sensor of the comparative example shown in FIG. 16 differs in that NPN transistors $Q_{A1}$, $Q_{A2}$ are used instead of the Darlington transistors DT1, DT2 (shown in FIG. 11) in photoelectric conversion circuits A4, B4.

Referring to FIGS. 14 and 15, the horizontal axis represents a hysteresis ratio ((non-detection→detection)/(detection−non-detection)), while the vertical axis represents the number of pieces. FIGS. 14 and 15 in this case show MOS variation distributions of the hysteresis ratio. It is noted that in FIGS. 14 and 15, a hysteresis ratio range from 550E-3 to 950E-3 is delimited by two longitudinal lines (solid lines) for an easier comparison ("E-3" represents $10\times^{-3}$).

In this case, the simulation result of the optical sensor of the comparative example shown in FIG. 14 showed that a coefficient of variation expressed as "standard deviation σ/mean value" was 12.36%, while the optical sensor of the invention shown in FIG. 15 resulted in a coefficient of variation of 4.16%.

In the optical sensor of the comparative example shown in FIG. 14, MOS transistors show quite large variations of hysteresis characteristic increasing with characteristics were unobtainable. On the other hand, in the optical sensor of the invention, as apparent from FIG. 15, it can be understood that MOS transistors constituting the constant current section can be operated in a saturation characteristic region, so that a sufficient drain-source voltage $V_{DS}$ can be ensured, the coefficient of variation being about ⅓, which is a great improvement of variations in the hysteresis characteristic.

As to electronic equipment using the optical sensor of the invention, the invention can preferably be used in equipment for object detection or detection of object's operating speed such as copiers, printers and portable equipment using photointerrupters high sensitivity and needing to be downsized, electrical appliances using motors, or the like.

Further, the invention can also preferably be used in electronic equipment that needs to be highly sensitive such as smoke sensors, proximity sensors and range sensors as well as in small-size electronic equipment incapable of ensuring sufficient capacity for incorporating the optical sensor.

The above first to sixth embodiments have been described on optical sensors that include the series-connected diodes $D_1, D_2, \ldots, D_n$, the NPN transistors $Q_{11}, Q_{12}$, the Darlington transistors DT1, DT2 as the current-voltage conversion section. However, without being limited to this, the current-voltage conversion section may be any one including a semiconductor device group having n PN junctions (where n is an integer of 2 or more) connected in series so that their forward directions are directed toward the photodiode side.

Although concrete embodiments of the present invention have been described hereinabove, the invention is not limited to the above first to sixth embodiments and may be embodied in various changes and modifications within the scope of the invention.

REFERENCE SIGNS LIST

PD1, PD2 photodiode
$Q_1$-$Q_{n+2}$ NPN transistor
$Q_R$ NPN transistor
R1 resistor
$D_1, D_2, \ldots, D_n$ diode
$Q_{OUT1}, Q_{OUT2}$ NPN transistor
I1, I2, I3 current source
C1 capacitor
$Q_{A1}, Q_{A2}$ NPN transistor
DG1, DG2 diode group
CMP1, CMP2 comparator
M1, M2 MOS transistor
DT0, DT1, DT2 Darlington transistor
$Q_{11}, Q_{12}, Q_{21}, Q_{22}$ NPN transistor
A1, A2, A3, A10, B1, B2, B3 photoelectric conversion circuit
E1 current source circuit

CITATION LIST

Patent Literature

PTL1: JP 2006-294682 A
PTL2: JP S57-142523 A
PTL2: JP H11-345995 A

The invention claimed is:
1. An optical sensor comprising:
a photodiode with its anode grounded;
a current-voltage conversion section having one end connected to a cathode of the photodiode;
a current source having one end connected to the other end of the current-voltage conversion section;
a power supply section for applying a constant voltage to the other end of the current source; and
a grounded-emitter or grounded-source output transistor having a base or gate connected to the cathode of the photodiode and a collector or drain connected to one end of the current source, wherein
the current-voltage conversion section includes a semiconductor device group having n PN junctions (where n is an integer of 2 or more) connected in series so that their forward directions are directed toward the photodiode side, and
a photocurrent which flows from a connecting point between the current-voltage conversion section and the current source to the photodiode is converted into a voltage and outputted as a photoelectric conversion signal.

2. The optical sensor as claimed in claim 1, wherein the power supply section is a constant voltage circuit which has power-supply-section use n+2 diodes (where n is an integer of 2 or more) connected in series so that their forward directions are of one same direction, and which outputs the constant voltage based on a forward voltage of the power-supply-section use series-connected n+2 diodes.

3. The optical sensor as claimed in claim 1, wherein the current-voltage conversion section is provided by n (where n is an integer of 2 or more) diodes connected in series so that their forward directions are directed toward the photodiode side.

4. The optical sensor as claimed in claim 1, wherein the current-voltage conversion section is a Darlington transistor in which a plurality of transistors are Darlington-connected, and
the constant voltage from the power supply section is applied to a collector of the Darlington transistor, a cathode of the photodiode is connected to an emitter of the Darlington transistor, and a collector or drain of the output transistor is connected to a base of the Darlington transistor.

5. The optical sensor as claimed in claim 1, wherein the current-voltage conversion section is a Darlington transistor in which a plurality of transistors are Darlington-connected, and
one end of the current source is connected to a collector of the Darlington transistor, a cathode of the photodiode is connected to an emitter of the Darlington transistor, and a collector or drain of the output transistor is connected to a base of the Darlington transistor.

6. The optical sensor as claimed in claim 1, wherein the current-voltage conversion section is a Darlington transistor in which a plurality of transistors are Darlington-connected,
the optical sensor further includes a current source circuit for feeding a current to the Darlington transistor, and
an output end of the current source circuit is connected to a collector of the Darlington transistor, a cathode of the photodiode is connected to an emitter of the Darlington transistor, and a collector or drain of the output transistor is connected to a base of the Darlington transistor.

7. The optical sensor as claimed in claim 4, further comprising
a grounded-emitter or grounded-source current-mirror use transistor having a collector or drain connected to a cathode of the photodiode and a base or gate connected in common to the output transistor, wherein
the Darlington transistor, the output transistor, and the current-mirror use transistor constitute a Wilson-type current mirror circuit.

8. The optical sensor as claimed in claim 1, further comprising
a comparator to one input terminal of which the photoelectric conversion signal is inputted.

9. The optical sensor as claimed in claim 1, further comprising:
two photoelectric conversion circuits each having the photodiode, the current-voltage conversion section, and the output transistor;
a semiconductor substrate on which the two photoelectric conversion circuits are formed;
the semiconductor device group in the current-voltage conversion section has the series-connected two PN junctions; and
a comparator to one input terminal of which the photoelectric conversion signal derived from one of the two photoelectric conversion circuits is inputted, and to the other input terminal of which the photoelectric conversion signal derived from the other one of the two photoelectric conversion circuits is inputted, wherein
the two PN junctions of the semiconductor device group in each of the current-voltage conversion sections of the two photoelectric conversion circuits are set in an alternately-crossing arrangement on the semiconductor substrate.

10. The optical sensor as claimed in claim 1, further comprising
two photoelectric conversion circuits each having the photodiode, the current-voltage conversion section, and the output transistor,
the current-voltage conversion section being a Darlington transistor in which a first-stage transistor and an output-stage transistor are Darlington-connected, wherein
the constant voltage from the power supply section is applied to a collector of the Darlington transistor, a cathode of the photodiode is connected to an emitter of the Darlington transistor, and a collector or drain of the output transistor is connected to a base of the Darlington transistor,
the optical sensor further comprises a comparator to one input terminal of which the photoelectric conversion signal derived from one of the two photoelectric conversion circuits is inputted, and to the other input terminal of which the photoelectric conversion signal derived from the other one of the two photoelectric conversion circuits is inputted,
one of the two photoelectric conversion circuits includes a grounded-emitter or grounded-source first current-mirror use transistor having a collector or drain connected to a cathode of the photodiode,
the other one of the two photoelectric conversion circuits includes a grounded-emitter or grounded-source second current-mirror use transistor having a collector or drain connected to a cathode of the photodiode and a base or gate connected to the collector or drain, and wherein
the base or gate of the second current-mirror use transistor is connected to the base or gate of the first current-mirror use transistor, and the Darlington transistor, the output transistor, and the second current-mirror use transistor constitute a Wilson-type current mirror circuit.

11. The optical sensor as claimed in claim 10, further comprising
a shielding part for shielding from input light for the photodiode of the other one of the two photoelectric conversion circuits.

12. Electronic equipment using the optical sensor as defined in claim 1.

* * * * *